May 23, 1961 J. F. HARRISON ET AL 2,985,080
COMBINED ROLLER AND TRANSPORT DEVICE THEREFOR
Filed July 7, 1958 2 Sheets-Sheet 1
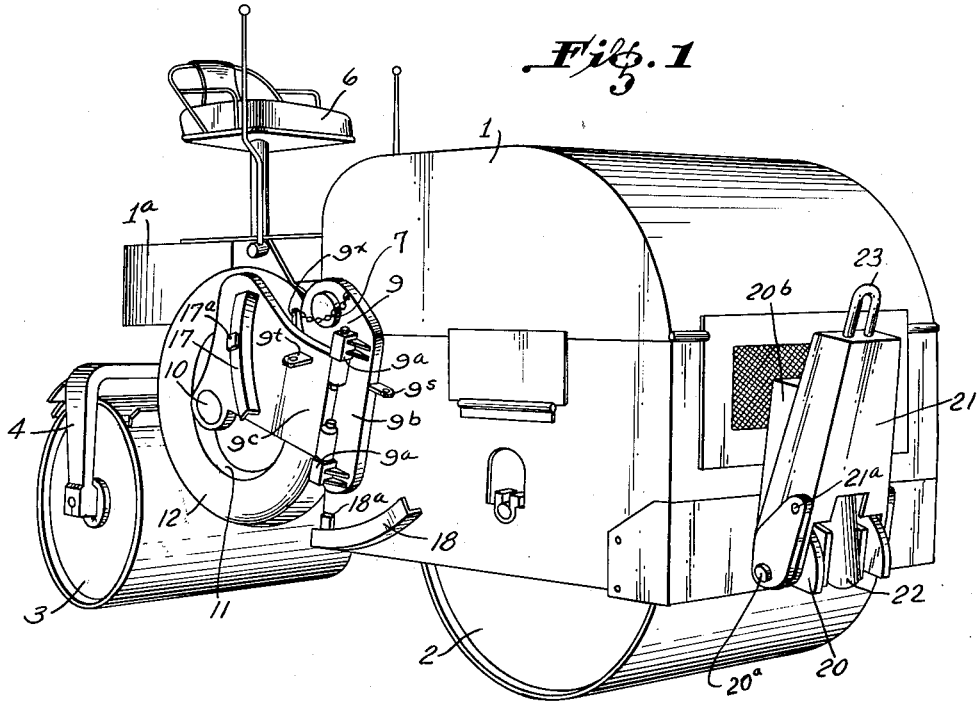
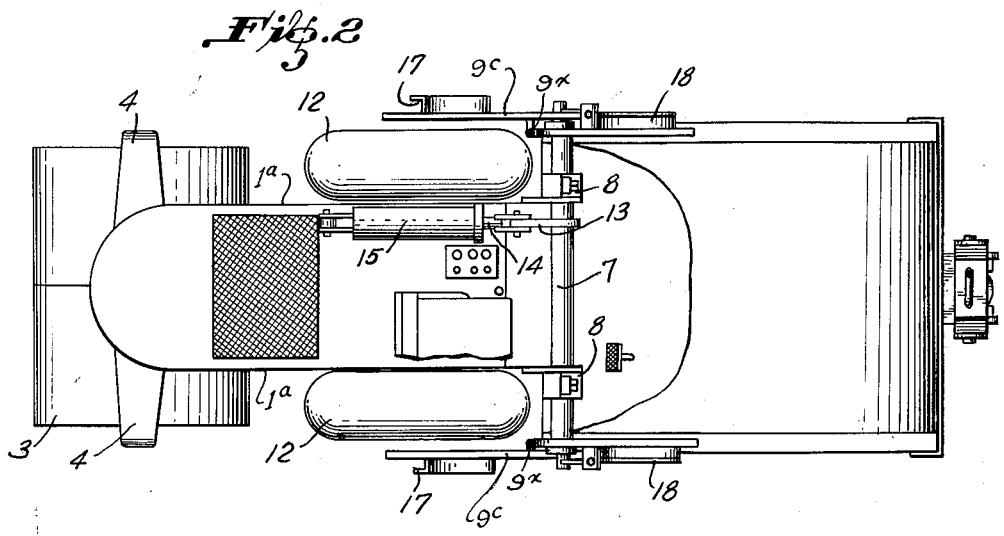
INVENTORS
John F. Harrison
William H. Mathys
Stanley Thompson
BY
ATTORNEYS

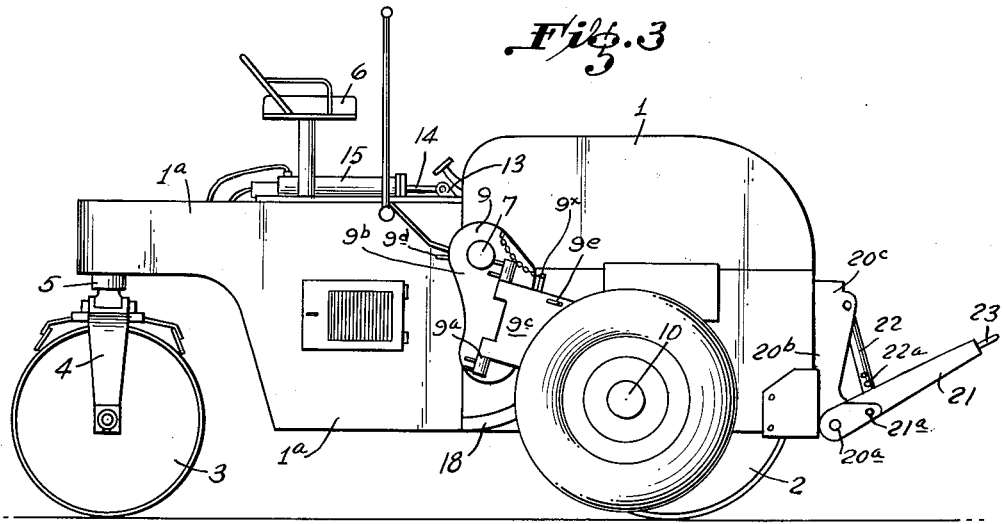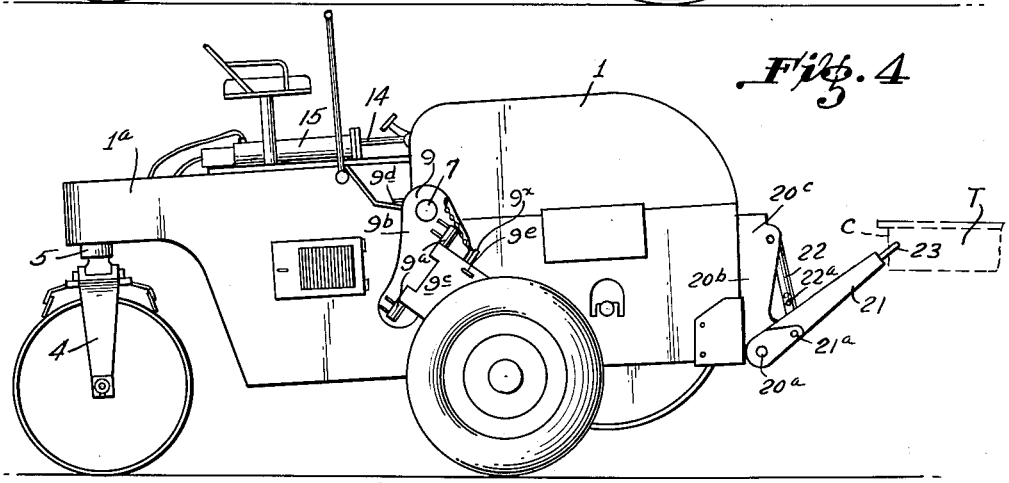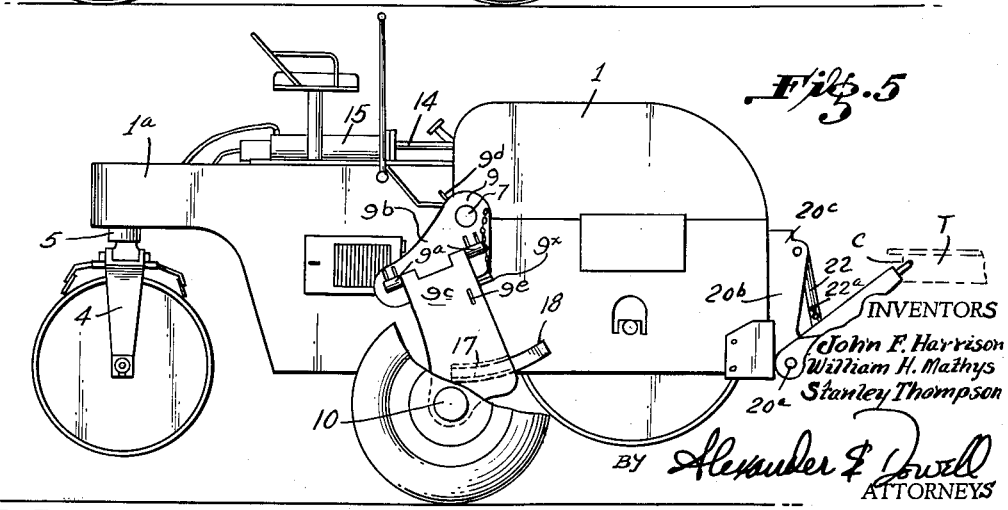

United States Patent Office 2,985,080
Patented May 23, 1961

2,985,080

COMBINED ROLLER AND TRANSPORT DEVICE THEREFOR

John F. Harrison, William H. Mathys, and Stanley Thompson, Springfield, Ohio, assignors to Koehring Company, Milwaukee, Wis., a corporation of Wisconsin Filed July 7, 1958, Ser. No. 746,901

5 Claims. (Cl. 94—50)

This invention is a continuation-in-part of our copending application Serial Number 646,610, filed March 18, 1957, and now abandoned and relates to transport means for road rollers or other machinery. More particularly the invention relates to a retractable transport device including power-actuated rubber-tired support means and hitch means providing a novel combination which when in use is capable of elevating the road roller off of its compaction rolls and into such position that it may be hitched to and transported behind a towing vehicle, and which during periods of disuse may be retracted and housed substantially entirely within the outer perimeter of the machine.

It is the object of this invention to provide a built-in transport device which, when extended from retracted or housed position, can be actuated to quickly and efficiently raise one end of the road roller off of the ground to a position where the hitch may be coupled to a towing vehicle, and then raise the roller to a level position suitable for towing.

Another object of this invention is the provision of a retractable transport device which when in use will permit the roller to be towed safely at relatively high highway speeds.

Still another object of the invention is to provide a retractable transport device which can be easily operated by one man both during raising and coupling of the roller for towing, and also during decoupling and lowering of the roller to return the latter to its working and compaction position.

Another object of the present invention is the providing of a towing hitch mounted on the roller frame at the heavier drive-roll end thereof to provide more stable towing, said hitch being adjustable in such a way that the angle between the hitch tongue and the frame may be selected so as to adapt the outer end of the tongue for engagement with various heights of couplings on different towing vehicles, the angle being selected so that, when coupled and raised into towing position, the roller will be disposed substantially level.

A very important object of this invention is the provision of a combined roller and retractable device in which, when the roller is being used for compaction purposes, the wheels of the transport device may be retracted and housed within recesses in the roller frame and thus confined substantially within the normal outer perimeter of the roller so that the overall dimensions thereof are not appreciably increased by the addition to the roller of the transport device. The provision of such structure, permitting the transport device to be disposed within the perimeter of the roller during periods of disuse, maintains the utility of the roller as high as possible since a roller provided with the present transport device may still be operated close to abutments such as curbs and walls during compaction.

The principal feature of this invention is the incorporating into a road roller of a transport device which when not in use is retracted out of the way of the operations of the roller and therefore does not compromise the full and efficient use of the roller, as such.

The present structure includes two arms, pivotally connected at their inner ends to a shaft extending transversely across the roller frame and power-actuated for the purpose of causing the arms to be rocked in unison from one position to another. The arms are disposed on opposite sides of the roller frame and each carries a transport wheel at its outer end. The arms are each articulated between their inner and outer ends to permit the wheels to be folded into the recesses in the roller frame during periods of disuse.

It is a further object of the invention to provide on each side of the roller frame means for securing each arm to the frame, such securing means providing strengthening of the transport assembly during use to eliminate strain on the power-actuated mechanism after the latter has functioned to rotate the shaft to the desired position of the arms, and at the same time preventing articulation of the arms toward the folded position.

Another object of the invention is to provide automatically-engaging securing means which confine the arms to extended position whenever they are supporting the roller, and which automatically release the arms for articulation as the arms are being retracted.

A further object is to provide a structure wherein the axes of the articulating hinges on the arms are nearer vertical than horizontal when the arms are in the position wherein they are to be folded to house the wheels, whereby the operator need lift only a small portion of the weight of the wheels and outer arm portions being folded.

Other objects and advantages of the invention will become apparent during the detailed discussion of the drawings, wherein:

Fig. 1 is a perspective view of a tandem roller having a hitch at one end and equipped with a retractable transport device, the frame of the tandem roller having been narrowed to provide recesses on each side into which the transport wheels may be folded and housed when not in use for transport purposes.

Fig. 2 is a plan view of the roller combination of Fig. 1.

Fig. 3 is a side elevation of the roller combination of Fig. 1, but showing the transport device wheels in outwardly-extended position.

Fig. 4 is a side elevation of the combination corresponding with Fig. 3 but showing the transport device arms rotated downwardly to force the wheels into contact with the ground and raise the end of the roller carrying the hitch upwardly in order to facilitate engagement of the hitch with the coupling of a towing vehicle.

Fig. 5 is a side elevation of the combination corresponding with Fig. 3 but showing the transport wheels moved into another position wherein they have been passed to the other side of the center of balance of the tandem roller in order to raise the tandem roller to a level towing position.

The present invention is illustrated in terms of an embodiment which will be described in connection with Figs. 1 through 5 showing the combination of retractable transport means with a tandem roller.

The roller comprises a basic frame 1 which during compaction operations is supported by a drive roll 2 and a guide roll 3. The drive roll 2 is driven by a prime mover such as an internal combustion engine through suitable transmission gears and control mechanisms, which have not been shown since they are old and well-known. The guide roll 3 is supported by a yoke 4 which is rotatably trunnioned in a casting 5, the trunnion casting 5 being rigidly fixed to the frame 1. The roller is ordinarily operated from a seat 6 using suitable controls conveniently placed at hand. The above roller structure is conventional except for the reduction in the width of the frame 1 from a location near the center of gravity of the roller toward the guide roll end, the reduced portion bearing the reference numeral 1a, and permitting housing of the wheels when the roller is being used for compaction purposes.

A transversely mounted shaft 7 has been added to the roller structure, this shaft being journaled in bearings 8 near the longitudinal center of gravity of the machine, as best seen in Fig. 2. The arms 9 are rigidly connected to the shaft 7 at their inner ends so that when the shaft is rotated the arms are moved in unison. The arms 9 are articulated along hinges 9a which divide the arms into inner and outer portions 9b and 9c for the purpose hereinafter described. Each of the outer portions 9c of the arms 9 carries a spindle 10. On each of the spindles 10 is journaled a ground-engaging transport wheel 11 which is preferably provided with a rubber tire 12.

The shaft 7 carries at a convenient location a crank arm 13, which arm is rigidly connected with the shaft 7 at one end, and is connected with a piston rod 14 of a hydraulic cylinder 15 which is actuated by fluid pressure from a controllable source (not shown). The hydraulic cylinder 15 may be pressurized in either direction so as to rotate the crank arm 13 and attached shaft 7, for the purpose of forcibly positioning the arms 9.

As can best be seen by comparison of Fig. 1 with Figs. 3, 4, and 5, the outer portions 9c of the arms 9 normally occupy one of two positions about the hinges 9a. In the position shown in Figs. 1 and 2, the arms 9 are folded about the hinges 9a so as to house the wheels 11 within the recessed portion 1a of the roller frame 1. In the position shown in Figs. 3, 4, and 5 the outer portions 9c of the arms 9 are extended so as to move the wheels from the housed position shown in Fig. 1 to the transport positions.

A number of pin locks are employed for the purpose of maintaining the outer arms 9c in various selected positions. The pin lock structures each include a pair of brackets and a pin which is passed through aligned holes in the brackets, the pins being in each case captivated to the structure by means of a small chain to prevent loss of the pin (Fig. 1). Referring now to particular structures, the arms are retained in folded position by two brackets 9d and 9e attached respectively to the arm portions 9b and 9c. When the arms are folded in the position shown in Fig. 2, a pin 9x is dropped through alined holes in the brackets 9d and 9e to retain the brackets aligned and thus retain the arm portions 9b and 9c folded.

Another pin lock is provided to hold each of the arm portions 9b and 9c in extended position, this lock comprising brackets 9s and 9t fixed respectively to the arm portions 9b and 9c, Fig. 1. The same pin 9x can be used to transfix the holes in these brackets when the arms are in extended position.

Referring now to Fig. 1, it will be seen that pairs of track locks 17 and 18 have also been provided. The track 17 is carried on the outer portion 9c of the arm 9 and cooperates with a similarly shaped track 18 on the outer surface of the roller frame 1. The tracks 17 and 18 are also visible in Fig. 2. When the outer portion 9c of the arm 9 is opened outwardly about the hinge 9a so that it lies against the inner arm 9b, the track 17 then engages within the track lock 18 and holds the outer portion 9c of the arm 9 in a position adjacent the frame 1 so as to prevent spreading of the wheels during transport, Fig. 5.

The track locks serve their main purpose when the transport wheels are in the full-down position as shown in Fig. 5. The arms 9 are moved into this position by action of the hydraulic cylinder 15 which drives the piston rod 14 outwardly so as to rotate the crank arm 13 and attached shaft 7. The arms 9 are thus rotated until a stop 17a comes in contact with a lower stop 18a on the frame of the road roller, Fig. 1. When this contact is made, the ground-engaging wheels 11 are then in towing position, and the track locks are mutually engaged along the full arc of the track 17. Both tracks 17 and 18 are curved about a common center lying on the axis of the shaft 7.

The present novel combination carries a hitch at one end of the roller. This hitch includes a bracket 20 having a pin 20a transversely disposed through the bracket and attaching to a tongue 21. The bracket 20 extends upwardly as at 20b and carries near its top end a smaller bracket 20c to which is attached an adjustment member which, in the embodiment illustrated, is a pipe 22 having several holes therethrough as at 22a, one of which can be aligned with a hole through the tongue 21 and receive a retaining pin 21a. The tongue 21 also includes at its outer end a towing eye 23. When the hitch is not in use, the pin 21a may be withdrawn and the adjustment member 22 oriented in a vertical position, Fig. 1, so that the towing tongue 21 may be folded upwardly to put it out of the way. The position when the towing hitch is being used is shown in Figs. 3, 4, and 5. A towing coupling C is shown in dashed lines as a part of a towing vehicle T, not shown.

Basically, the operation of the structure shown is such that the wheels 11 may be retracted and folded into the recessed portion 1a of the roller frame 1 during intervals when the machine is being used for rolling and compaction purposes. When, however, it is desired to transport the machine at higher speeds on a highway, the pin 9x is removed from the brackets 9d—9e and the outer portions of the arms 9c are pivoted 180° about the hinge 9a from the position shown in Fig. 1 to the position shown in Fig. 3. When the outer portion 9c of each of the arms 9 has been moved to the position shown in Fig. 3, the pin lock 9s—9t is then engaged by insertion of the pin 9x to lock the outer portion 9c tightly against the inner portion 9b of the arm 9.

The hydraulic cylinder 15 is then pressurized to extend the piston rod 14 to the right and rotate the crank arm 13 and attached shaft 7 clockwise. Such clockwise rotation of the transverse shaft 7 causes the wheel 11 to be forced into engagement with the ground so as to raise the hitch end of the roller off of the ground while leaving the other end of the machine in contact with the ground. In this position, the hitch tongue 21 and the adjustment member 22 are pinned in extended position by the pin 21a, as shown in Fig. 3. When the towing ring 23 has been connected with the coupling C shown at the rear of the towing vehicle T, the hydraulic cylinder 15 is then further pressurized so as to drive the crank arm 13 and shaft 7 further in the clockwise direction until the stop 17a engages the frame member stop 18a of the road roller. The use of the stops and the tracks relieves the pressure cylinder 15 and associated crank arm 13 of the strain of maintaining the arms 9 in the towing position. In addition, the adjustment member 22 may be adjusted for the purpose of altering the angle of the tongue 21 with respect to the frame 1 of the road roller for the purpose of leveling the roller when coupled to a towing vehicle with respect to the ground surface over which it is to be towed.

The ground-engaging transport wheels may be returned to their folded position, as shown in Fig. 1, by a reversal of the above-mentioned steps.

The scope of the present invention is not to be limited by the exact form illustrated in the drawings, for obviously changes may be made therein within the limitations set forth in the following claims.

We claim:
1. A transport device for elevating and transporting a road rolling machine behind a towing vehicle, said machine having a longitudinal center of balance located be- tween the ends of its frame, said device comprising a towing hitch fixed to one end of the frame; a shaft journaled transversely of said frame adjacent said center of balance; two parallel arms fixed to the ends of said shaft on opposite sides of said frame; a transport wheel journaled on the outer end of each arm, the axes of the wheels being disposed in mutual alignment transversely of the frame and the shaft and arms being rotatable through an arc extending from a first position in which the wheels are out of contact with the ground through a second position in which the wheels contact the ground on the side of the longitudinal center of balance of the machine nearer the hitch to raise the hitch end of the machine and finally to a third position in which the axes of the wheels have passed through said center of balance and are located on the other side thereof to raise the other end of the machine from the ground; drive means coupled between said frame and said shaft for selectively rotating the shaft arms into said positions; hinge means intermediate the ends of the arms and disposed transversely thereof whereby the outer wheel supporting portions of the arms when in the first position can be folded from extended position about the shaft supported portions thereof to place the wheels in a stored position along the sides of the frame; arcuate track means on each side of the frame; and means on the outer portion of each arm interengaging with said arcuate track means to guide the arms in said second and third positions, and said means on the arms disengaging the track means in said first position so that said outer wheel supporting portions of the arms can be folded.

2. In a device as set forth in claim 1, said frame having a zone of transversely reduced width on each side of the machine and said wheels being received within said zone when in folded position.

3. In a device as set forth in claim 1, abutments on said frame engaging said means on the arms for limiting movement thereof beyond said third position after the wheels have passed through said longitudinal center of balance.

4. In a device as set forth in claim 1, lock means connected with the two portions of each arm for locking said portions in at least one position of the hinge means.

5. A transport device for elevating and transporting a road rolling machine behind a towing vehicle, said machine having a longitudinal center of balance located between the ends of its frame, said device comprising a towing hitch fixed to one end of the frame; a shaft journaled transversely of said frame adjacent said center of balance; two parallel arms fixed to the ends of said shaft on opposite sides of said frame; a transport wheel journaled on the outer end of each arm, the axes of the wheels being disposed in mutual alignment transversely of the frame and the shaft and arms being rotatable through an arc extending from a first position in which the wheels are out of contact with the ground through a second position in which the wheels contact the ground on the side of the longitudinal center of balance of the machine nearer the hitch to raise the hitch end of the machine and finally to a third position in which the axes of the wheels have passed through said center of balance and are located on the other side thereof to raise the other end of the machine from the ground; drive means coupled between said frame and said shaft for selectively rotating the shaft and arms into said positions; hinge means intermediate the ends of the arms and disposed transversely thereof whereby the outer wheel supporting portions of the arms when in the first position can be folded from extended position about the shaft supported portions thereof to place the wheels in a stored position along the sides of the frame; and means on the arms for selectively maintaining the arms in their folded and extended positions.

References Cited in the file of this patent

UNITED STATES PATENTS

| 554,359 | Breed | Feb. 11, 1896 |
| 1,667,267 | Pitcher | Apr. 24, 1928 |
| 1,717,358 | Adcock | June 18, 1929 |
| 1,887,357 | Loening | Nov. 8, 1932 |
| 2,114,412 | Wilson | Apr. 19, 1938 |
| 2,221,764 | Graham | Nov. 19, 1940 |
| 2,608,143 | Haupt | Aug. 26, 1952 |
| 2,752,832 | Fink | July 3, 1956 |
| 2,829,390 | Noland | Apr. 8, 1958 |

FOREIGN PATENTS

| 151,679 | Australia | June 1, 1953 |
| 202,928 | Australia | Aug. 15, 1956 |